(12) United States Patent
Meunier et al.

(10) Patent No.: US 10,329,156 B2
(45) Date of Patent: Jun. 25, 2019

(54) OXYGEN FUNCTIONALIZED GRAPHENE NANOFLAKE, A STABLE AND SURFACTANT-FREE GRAPHENE NANOFLAKE NANOFLUID AND METHOD FROM MAKING SAME

(71) Applicant: THE ROYAL INSTITUTION FOR THE ADVANCEMENT OF LEARNING / MCGILL UNIVERSITY, Montreal (CA)

(72) Inventors: Jean-Luc Meunier, Montreal (CA); Dimitrios Berk, Montreal (CA); Ulrich Legrand, Montreal (CA); Norma-Yadira Mendoza Gonzalez, Montreal (CA); Pierre-Alexandre Pascone, Montreal (CA)

(73) Assignee: THE ROYAL INSTITUTION FOR THE ADVANCEMENT OF LEARNING/MCGILL UNIVERSITY, Quebec (CA)

( * ) Notice: Subject to any disclaimer, the term of this patent is extended or adjusted under 35 U.S.C. 154(b) by 0 days.

(21) Appl. No.: 15/165,574

(22) Filed: May 26, 2016

(65) Prior Publication Data
US 2016/0376153 A1    Dec. 29, 2016

Related U.S. Application Data

(60) Provisional application No. 62/166,375, filed on May 26, 2015.

(51) Int. Cl.
*C01B 32/198*    (2017.01)
*C01B 32/194*    (2017.01)
(Continued)

(52) U.S. Cl.
CPC .......... *C01B 32/198* (2017.08); *C01B 32/194* (2017.08); *C01B 32/23* (2017.08);
(Continued)

(58) Field of Classification Search
CPC .............. C01B 31/043; C01B 31/0484; C01B 2204/22; C01B 2204/04; C01B 32/194;
(Continued)

(56) References Cited

U.S. PATENT DOCUMENTS

| 9,530,531 | B2 * | 12/2016 | Lin | .......................... | H01B 1/04 |
| 2011/0186789 | A1 * | 8/2011 | Samulski | ............... | B82Y 30/00 |
|  |  |  |  |  | 252/514 |
| 2014/0231718 | A1 * | 8/2014 | Lin | .......................... | H01B 1/04 |
|  |  |  |  |  | 252/503 |

FOREIGN PATENT DOCUMENTS

WO    2014000108    1/2014

OTHER PUBLICATIONS

R. Pristavita et al., "Carbon Blacks Produced by Thermal Plasma: the Influence of the Reactor Geometry on the Product Morphology", Plasma Chem. Plasma Process (2010), 30: 267-279.
(Continued)

*Primary Examiner* — Daniel S Metzmaier
(74) *Attorney, Agent, or Firm* — Norton Rose Fulbright Canada LLP

(57) ABSTRACT

The present describes an oxygen functionalized nanoflake (O-GNF), a stable nanofluid in which the graphene nanoflakes remain dispersed or in suspension free of surfactants, and the method of making the oxygen-functionalized nanoflake. The oxygen-functionalized graphene nanoflake (O-GNF and/or O—N-GNF) comprises a single-crystal graphene nanoflake of 5-20 atomic planes comprising a surface oxygen-functionalization, wherein the O-GNF comprise a degree of oxygen functionalization from about 6 to about 25 at. % oxygen by weight of the GNF with a preferred oxygen functionalization of about 14 at. % oxygen.

5 Claims, 15 Drawing Sheets

(51) Int. Cl.
 *C01B 32/23* (2017.01)
 *B82Y 40/00* (2011.01)
 *B82Y 30/00* (2011.01)

(52) U.S. Cl.
 CPC .............. *B82Y 30/00* (2013.01); *B82Y 40/00* (2013.01); *C01B 2204/04* (2013.01); *C01B 2204/22* (2013.01); *Y10S 977/734* (2013.01); *Y10S 977/847* (2013.01)

(58) Field of Classification Search
 CPC ... C01B 32/198; C01B 32/23; Y10S 977/734; Y10S 977/847; B01F 3/12; B01F 17/0021
 USPC .............................. 516/32, 78; 977/734, 847
 See application file for complete search history.

(56) References Cited

OTHER PUBLICATIONS

R. Pristavita et al., "Carbon Nano-Flakes Produced by an Inductively Coupled Thermal Plasma System for Catalyst Applications", Plasma Chem. Plasma Process (2011), 31: 393-403.
P.-A. Pascone et al., "A Stable and Active Iron Catalyst Supported on Graphene Nano-Flakes for the Oxygen Reduction Reaction in Polymer Electrolyte Membrane Fuel Cells", Catalysis Today (2013), 162-167.

* cited by examiner

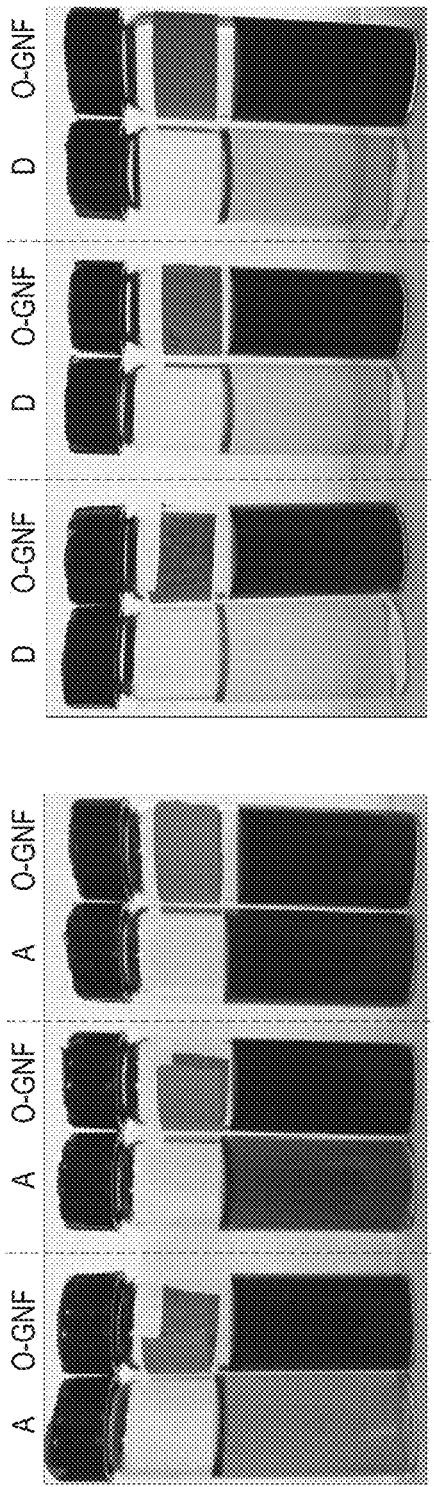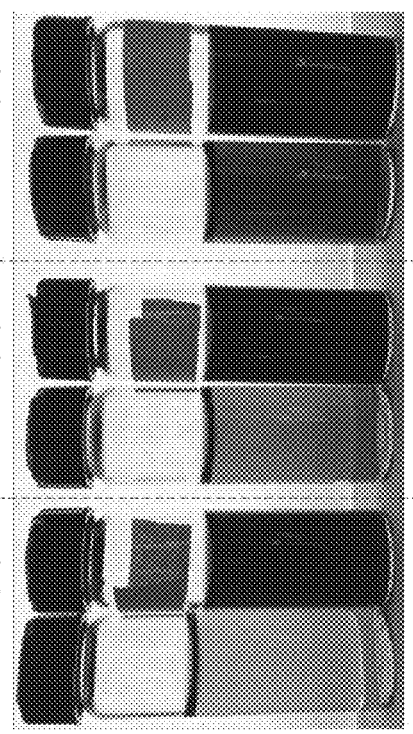

OXYGEN FUNCTIONALIZED GRAPHENE NANOFLAKE, A STABLE AND SURFACTANT-FREE GRAPHENE NANOFLAKE NANOFLUID AND METHOD FROM MAKING SAME

FIELD

The present describes an oxygen functionalized nanoflake, a stable nanofluid in which the graphene nanoflakes remain dispersed or in suspension, and the method of making the oxygen functionalized nanoflake.

BACKGROUND

A method to produce highly crystalline carbon powders in the shape of graphene flakes was described by Pristavita et al using the plasma decomposition of methane [R. Pristavita et al., *Plasma Chem Plasma Process*, 30: 267-279, 2010]. Modelling and experimental optimization enabled the ability to obtain pure, homogeneous, and well-crystallized powders having between 5-15 graphitic layers (10 layers being typical) and in-plane dimensions of roughly 100×100 nm. The high surface area and the crystallinity of the graphene nanoflakes (GNFs) made them good candidates to support catalytic sites.

The GNFs of Pristavita focused on adding nitrogen functionality through the addition of nitrogen in the main plasma stream during the GNF nucleation phase. This resulted in low nitrogen contents below 2 at % [R. Pristavita et al., *Plasma Chem Plasma Process*, 31: 393-403, 2011]. In a follow up study, these N-GNFs were extracted and functionalized with iron by a wet chemical method for use as replacement of the platinum catalyst typically used in fuel cells. The catalyst obtained showed both activity and full stability towards the oxygen reduction reaction (ORR) over 100-hour tests in polymer membrane fuel cells (PEM-FC) [P.-A. Pascone et al., *Catalysis Today*, 2013]. The iron functionalization step relied on the dispersion of GNFs in a mixture of water and ethanol; however the hydrophobic nature of GNFs made iron incorporation inefficient because of the partial agglomeration of nanoparticles in solution.

There is a need for a hydrophilic version of GNFs that can be dispersed/suspended in polar solvents so as to reduce the problem of partial agglomeration.

SUMMARY

Described herein are fully hydrophilic GNFs produced by adding oxygen functionalities to the nanomaterial directly within the plasma reactor. The new functionalized graphene nanoflake material is characterized and compared to hydrophobic GNFs to determine differences in the chemical structure.

In accordance with one aspect of the present invention, there is provided an oxygen-functionalized graphene nanoflake (O-GNF and/or O—N-GNF) comprising a single-crystal graphene nanoflake of 5-20 atomic planes comprising a surface oxygen-functionalization, wherein the O-GNF comprise a degree of oxygen functionalization from about 6 to about 25 at. % oxygen by weight of the GNF.

In accordance with another aspect of the oxygen-functionalized graphene nanoflake herein described, the degree of oxygen functionalization is from about 10% to about 20 at. % oxygen by weight of the GNF.

In accordance with yet another aspect of the oxygen-functionalized graphene nanoflake herein described, the degree of oxygen functionalization is from about 12% to about 15 at. % oxygen by weight of the GNF.

In accordance with still another aspect of the graphene nanoflake herein described, wherein the degree of oxygen functionalization is from about 13% to about 15 at. % oxygen by weight of the GNF.

In accordance with yet still another aspect of the oxygen-functionalized graphene nanoflake herein described, the degree of oxygen functionalization is from about 14 at. % oxygen by weight of the GNF.

In accordance with another aspect of the oxygen-functionalized graphene nanoflake herein described, the GNF is composed of an average of 10 atomic planes of single-crystal graphene.

In accordance with another aspect of the present invention, there is provided a suspension of an oxygen-functionalized graphene nanoflake (O-GNF and/or O—N-GNF) comprising a single-crystal graphene nanoflake of 5-20 atomic planes comprising a surface oxygen-functionalization, wherein the O-GNF comprise a degree of oxygen functionalization from about 6% to about 25 at. % oxygen by weight of the GNF, and a polar solvent.

In accordance with a further aspect of the suspension herein described, wherein the suspension is stable for at least 3 months.

In accordance with yet a further aspect of the suspension herein described, the suspension is stable for 1 year.

In accordance with still a further aspect of the suspension herein described, the suspension is substantially free of surfactants.

In accordance with yet still a further aspect of the suspension herein described, the suspension comprises a zeta potential from about −37 mV to about −44 mV in 1 mM $NaHCO_3$ solution.

In accordance with an embodiment of the suspension herein described, the zeta potential is from about −41 mV to about −44 mV in 1 mM $NaHCO_3$ solution.

In accordance with another embodiment of the suspension herein described, the polar solvent is selected from the group consisting of water, $C_1$-$C_4$ alcohol and combinations thereof.

In accordance with yet another embodiment of the suspension herein described, the suspension comprises a ratio of 0.625 mg GNF/mL of solvent.

In accordance with yet another aspect of the present invention, there is provided a method of producing an oxygen-functionalized graphene nanoflake (O-GNF and/or O—N-GNF), the method comprising; providing a thermal plasma reactor with an expansion zone and a downstream collection zone; providing a graphene nanoflake (GNF and/or N-GNF) comprising a single-crystal graphene of 5-20 atomic planes at the downstream collection zone; and functionalizing the GNF and/or N-GNF at the downstream collection zone with an oxygen containing stream decomposed in the thermal plasma reactor, wherein the O-GNF and/or O—N-GNF comprises a surface oxygen-functionalization and wherein the O-GNF comprise a degree of oxygen functionalization from about 6 to about 25 at. % oxygen by weight of the GNF.

In accordance with still another embodiment of the method herein described, the degree of oxygen functionalization is from about 10% to about 20 at. % oxygen by weight of the GNF.

In accordance with yet still another embodiment of the method herein described, the thermal plasma reactor comprises a thermal plasma source with a power level from about 10 kW to above 100 kW.

In accordance with a further embodiment of the method herein described, the power level is from a 35 kW to a 60 kW.

In accordance with yet a further embodiment of the method herein described, the thermal plasma reactor operates at a pressure below atmospheric.

In accordance with still a further embodiment of the method herein described, the pressure is from 13.8 and 55.2 kPa.

In accordance with yet still a further embodiment of the method herein described, the method has a total run time for the steps of providing the graphene nanoflake (GNF and/or N-GNF) and functionalizing the GNF and/or N-GNF of less than one hour.

In accordance with yet another aspect of the method herein described, the total run time is 30 to 45 minutes.

In accordance with still another aspect of the method herein described, the total run time is approximately 30 minutes.

In accordance with yet still another aspect of the method herein described, the degree of oxygen functionalization is from about 14 at. % oxygen by weight of the GNF.

In accordance still a further embodiment of the method herein described, the O-GNF is composed of an average of 10 atomic planes of single-crystal graphene.

BRIEF DESCRIPTION OF THE DRAWINGS

FIG. 12A is a visual photographic comparison of three concentration (25, 50, and 100 mg/L) of A (Edge Oxidized graphene powder and suspension from Sigma Aldrich—Left handside) and O-GNF of the present invention (Right Handside);

FIG. 12B is a visual photographic comparison of three concentration (25, 50, and 100 mg/L) of D (Nano graphene oxide from Graphene Supermarket—Left handside) and O-GNF of the present invention (Right Handside);

FIG. 12C is a visual photographic comparison of three concentration (25, 50, and 100 mg/L) of F (Graphene nanofluid from US-Nano—Left handside) and O-GNF of the present invention (Right Handside);

DETAILED DESCRIPTION OF THE INVENTION

The present invention will be further described in a regard to the Figures and the following description.

Figure 11B:
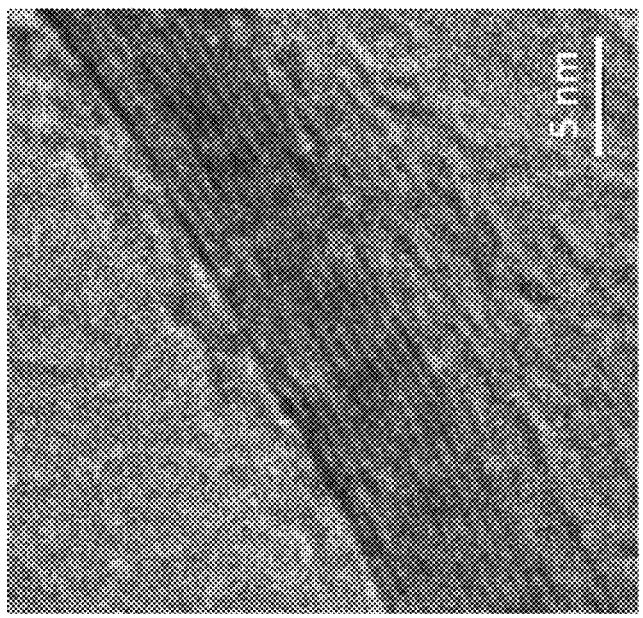
FIG. 11B is a more highly magnified Scanning Electron Micrograph (SEM) of the N-GNF of FIG. 11a) where the atomic layers of the N-GNF are clearly visible (PRIOR ART)
Figure 11A:
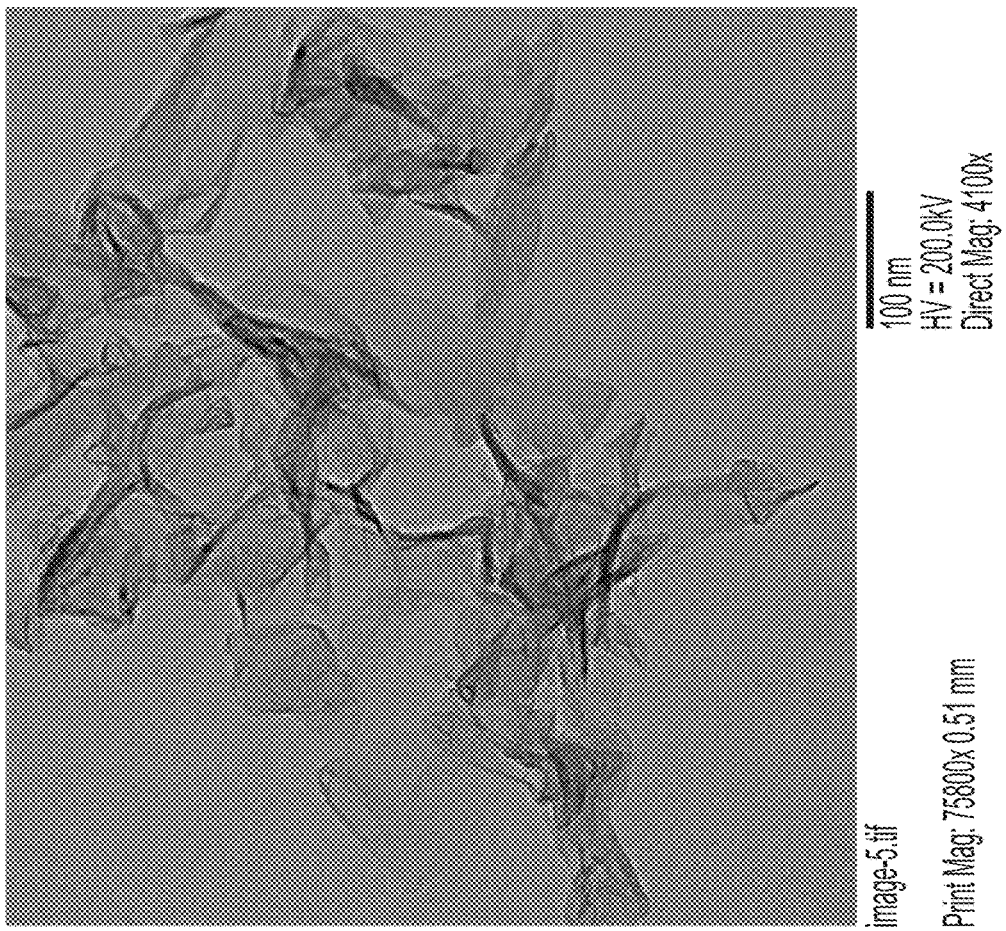
FIG. 11A is a Scanning Electron Micrograph (SEM) of a N-GNF that may be provided and serve as a raw material for the oxygen-functionalized GNF material of the present invention (PRIOR ART)

A graphene nanoflake (GNF) is defined herein as is totally crystalline and non-porous; is a single-crystal graphene nanoflake having 5-20 atomic planes that may also include nitrogen functionalization (N-GNF). GNF and N-GNF serve as a raw material of the oxygen-functionalized material, that is illustrated in FIG. 11.

A single crystal, graphene nanoflake, is defined as a single crystal sheet of graphene that is substantially free of amorphous carbon regions, and as such is free of the significant degree of disorder that is required for support and generation of the catalytic sites in the prior art carbon. Furthermore, the GNF of the present invention is substantially free of spherical-like carbon black structures of the prior art that are composed of a mixture of amorphous/crystalline and disordered regions. The "single-crystal" graphene herein described is significantly different from carbon blacks of the prior art, these prior art carbon blacks are strongly multi-crystalline, comprising a large number of very small crystallites separated by unorganized carbon regions. A single crystal is also understood to be a crystal substantially free of grain boundaries where the crystal lattice of the crystalline graphene herein described is continuous and unbroken to the edge of the crystal.

The GNFs of the present invention may also be nitrogen functionalized, or N-GNFs and either GNF or N-GNF may serve as the raw material of the oxygen-functionalized graphene nanoflake described herein.

An oxygen-functionalized graphene nanoflake (O-GNF and/or O—N-GNF) is based on the GNF and N-GNF that has a degree of oxygen functionalization from about 1.3 to about 25 at. % oxygen by weight of the GNF.

Figure 8:
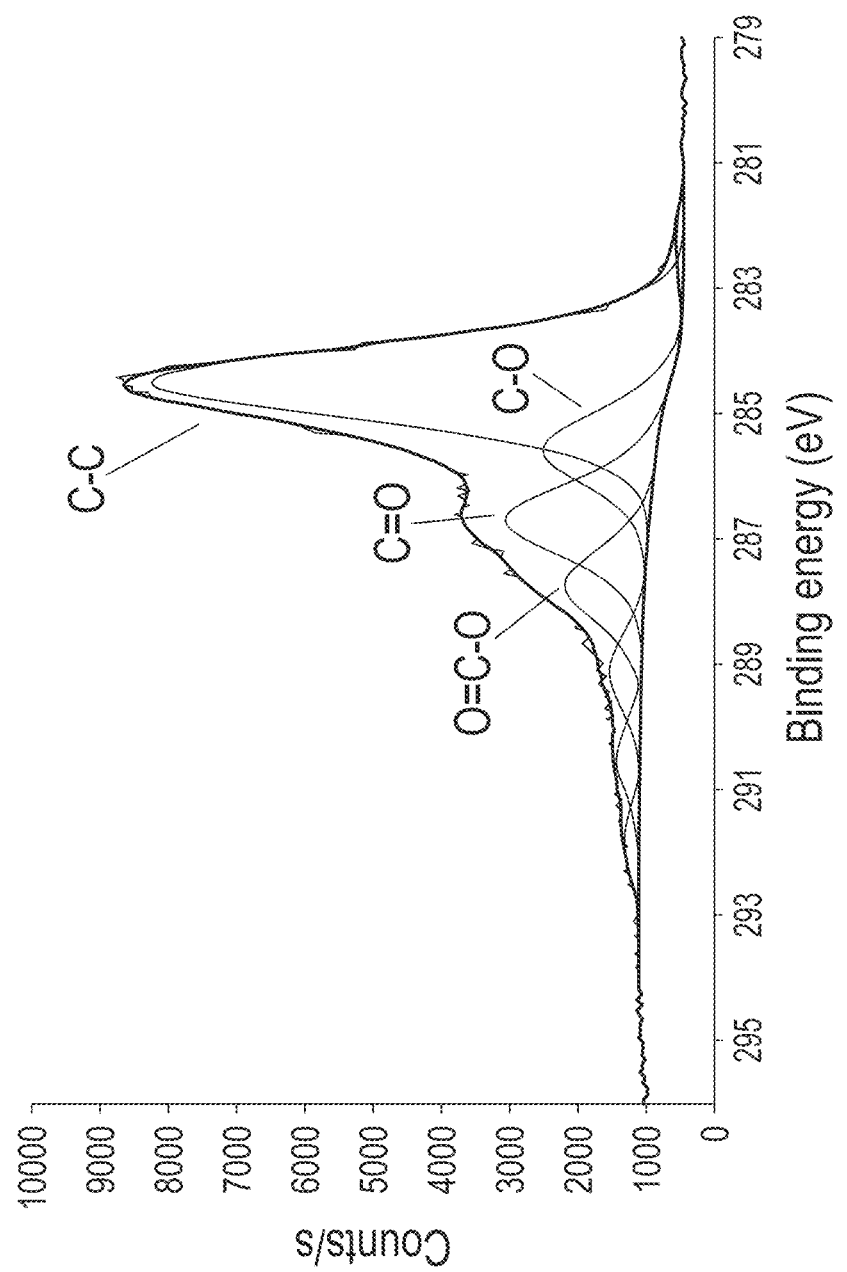
FIG. 8 is a high resolution and deconvolution of carbon peak and deconvolution for O-GNFs functionalized according to FIG. 6, the chemical structure indicate the oxygen is added to GNF through primary chemical bonds with carbon.

Oxygen functionalization of O-GNF and/or O—N-GNF described herein is found substantially on the surface of the O-GNF and/or O—N-GNF defined herein. Any nitrogen functionalization occurs on the edges as can be seen in (FIG. 8) surrounding the GNF sheet-like structure composed of 5-20 atomic planes of graphene.

Figure 1:
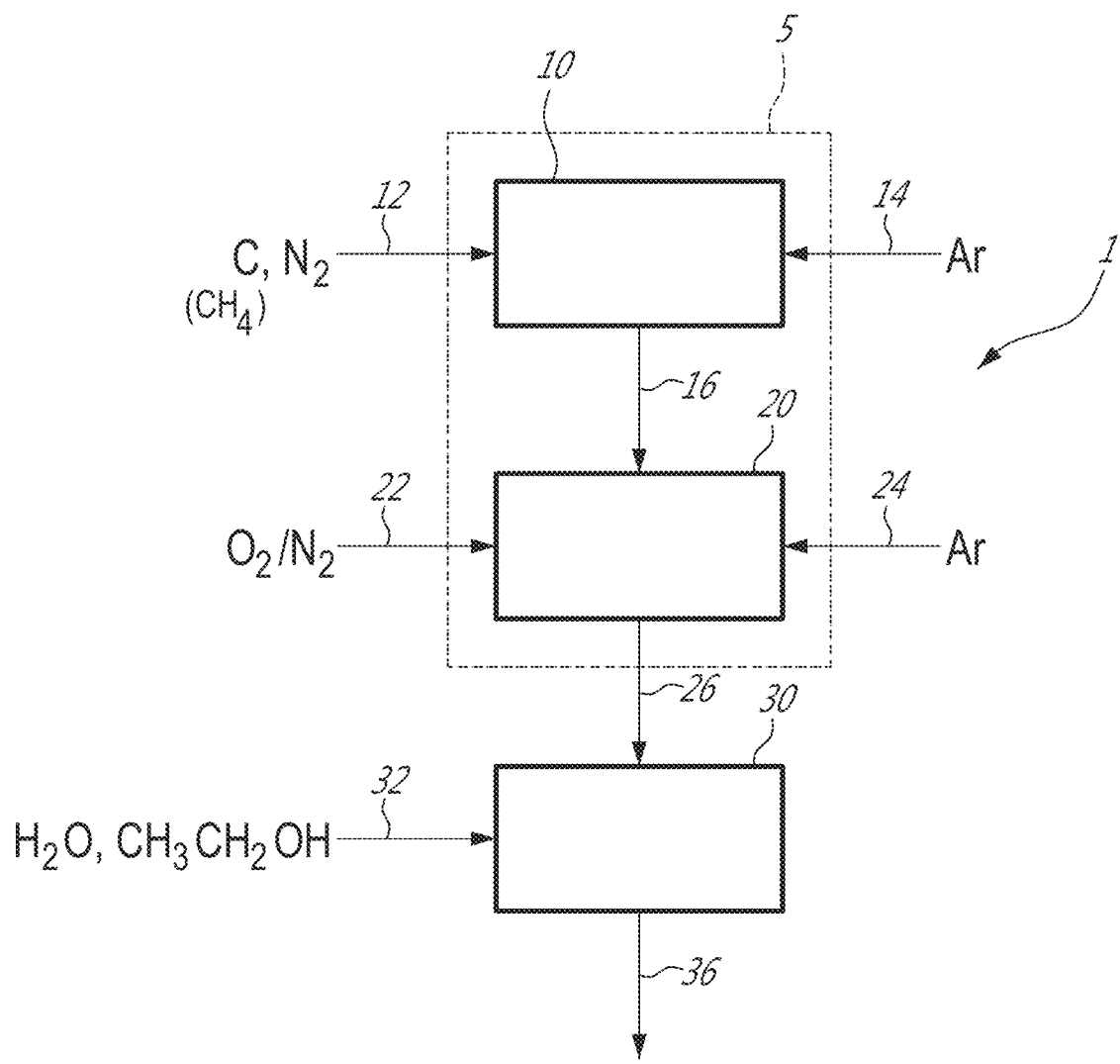
FIG. 1 is a block diagram of a method of producing an oxygen functionalized graphene nanoflake according to one embodiment of the present invention.

One embodiment of an overall method for producing 1, the O-GNFs and/or O—N-GNFs, of the present invention is illustrated in FIG. 1.

The overall O-GNF method 1 occurs in a thermal plasma reactor 5 with an expansion zone, and begins with a first step providing GNFs and/or N-GNFs. The GNF and/or N-GNF in a first step/stage 10, can be provided by starting with a carbon source 12, that is in a preferred embodiment, methane and nitrogen. This carbon source is decomposed within an argon plasma 14 at high temperature. In a preferred embodiment, the plasma is an (Inductively Coupled Plasma) ICP plasma torch. In this first stage 10 of the process, GNFs nucleate 16 and grow within the high temperature plasma stream downstream of the plasma torch, and the nanoparticles are deposited within the reactor expansion zone (on the side walls and on the downstream bottom plate) of the reactor set in an axisymmetric stagnation point flow geometry pattern. This downstream zone of the reactor 5 comprises a collection plate and the side walls of the reactor and is also called the downstream collection zone (DCZ). The collection plate and the side walls of the reactor are both opposite the argon plasma 14 torch.

The entire thermal plasma reactor 5 including the pumping geometry provided has a full symmetry in the azimuthal direction (i.e same geometry occurs on all angles around the axis for any position z along this axis). The end plate of the reactor is a disc perpendicular to the axis, this disc collecting most of the GNF produced (in the downstream collection zone). The disc generates a stagnation point for the flow line exactly on the axis, while the flow lines away from the axis will drastically deviate to a fully radial flow on the plate, i.e. the "stagnation point flow geometry pattern" (axial to the plate, fully radial on the plate). Note that because of the conical expansion of the reactor, the "axial" flow is in fact a slightly expanding flow. There is no turbulence generated, and no azimuthal flow lines occur, that is, all flow is along expansion axis, that transforms to an all radial flow to the exit port gap surrounding the end plate.

The first stage 10 of the overall process 1 corresponds to the formation of the GNF from a homogeneous nucleation process, meaning the GNF solid structure nucleates directly from the low concentration of carbon atoms present in the gas phase using methane as a precursor. This first stage 10 of the process corresponds to the making of the GNF structure as described in WO2014/000108 A1 PCT application that is herein incorporated by reference in its entirety, and with the plasma conditions indicated at paragraph [00044] of WO2014/000108 A1, and produces the GNF and/or N-GNF previously defined.

A stable cluster of carbon atoms is formed in a specific zone of the reactor located in a very high temperature domain between 3,000 and 5,000 K (more specifically between 3,000-4,000K); this is the initial solid carbon seed that will rapidly grow to form the GNF particles. Besides the very high local temperature, the fluid dynamics being set in the reactor having a specific conical geometry enables a relatively long residence time in the 3000-5000 K window, this residence time is calculated to be between 10-20 ms (note: ms=$10^{-3}$ s) It is submitted that although this time interval may seem to be small, it is in fact very long when compared to the nucleation and growth process. The high temperature/long residence time strongly affect the structure of the initial carbon particle; the initial stable cluster of carbon atoms is seen to organize into a crystalline structure based on the structure of graphite. Graphite being a layered structure with each layer made of carbon atoms strongly bonded to each other (primary bonds), while the bonding between layers is relatively weak (secondary bonding). The first stage continues with each new carbon atom arriving on the surface of the growing particle generally transported to the edges of the layered sheets and thereby inducing a 2-dimensional (2D) growth pattern of the GNF structure.

The GNF structures of the present invention have on average 10 atomic layer thickness roughly, set by the initial stable cluster, and a sheet side length and width of roughly 100×100 nm, that essentially relate to the growth time period. It should be noted that some variation of the GNF structure is seen with length and width varying from 50–150×50–150 nm. If nitrogen is also present in this first stage 10, the high temperatures tend to dissociate $N_2$ into atomic nitrogen. The GNF structures integrate in flight up to 2 atomic % nitrogen in this first step, with nitrogen bonded on the edges of the GNF sheets. This can be observed in very high resolution electron microscopy with atomic species contrast (EDX) and by XPS for the type of primary bonds. Higher at % N values can be achieved up to around 35 at % N as disclosed in WO2014/000108 A1.

The GNFs or 2% N-GNFs (when nitrogen is present) are carried by the gas stream and get deposited on the side walls and on the end-plate of the reactor set in a stagnation point flow geometry. The duration of the first stage sets the amount of GNF deposited (typical amount of 200 mg of GNF for a 10 minute run in the first stage, paragraph [00053] of WO2014/000108 A1). The GNF powders deposited form a very open structure with little agglomeration and very high porosity.

Shortly after or immediately after the first step 10, the GNFs or N-GNFs 16 that nucleate and are deposited on the walls and on the collecting end-plate in the expansion zone of the reactor 5, are reacted in a second step, oxygen functionalization 20. The second step oxygen functionalization the provided GNFs or N-GNFs are functionalized by changing the gas inlet from methane and nitrogen to an oxygen containing gas such as, air 22 (79% nitrogen and 21% oxygen) that similarly to the first step is decomposed in the argon plasma 24. In a preferred embodiment the air flowrate can be set at approximately 15 slpm. Although schematically illustrated as separate stream 12 and 22 the raw materials (the carbon source 12, and the air containing stream 22) may enter via the same conduit into the thermal plasma reactor 5. This streams 14 and 24 illustrating the argon plasma although illustrated as two streams in FIG. 1 may be the same conduit that decomposes both streams 12 and 22 into active species and then functionalized the GNF and/or N-GNF in the downstream collection zone of the reactor 5. The oxygen functionalization of the GNF and/or N-GNF is understood as covalent bonding of oxygen species on the GNF and/or N-GNF.

Furthermore, conditions are also set for the plasma power and pressure in the reactor, the various conditions together with the duration of the second oxygen functionalization stage 20 lead to different percentage of oxygen that is observed to be bonded to the GNF surface. The atomic percentage values of Oxygen (at %.O) on the GNF can be tuned inside the reactor from 0 at % O to above 20 at % O through a variation of the process conditions and the functionalization time. The ability to control the at % O value on the GNF and to maintain its level to low values below 20 at % O is in contrast to higher at % O values of the prior art. Higher at % O values are known to be detrimental to the structure of the graphene, and result in loss of crystallinity and high defect concentration due to the oxygen bonds. The power level of the present reactor is based on inductively coupled thermal plasma (ICP) sources with power levels from ~10 kW to above 100 kW. The source used for the demonstration experiments is a 35 kW ICP plasma torch, operated typically at 20 kW. The laboratory reactor has capacity to scale up to a 60 kW plasma torch, i.e. an industrial level. Maximum temperatures within the plasma source are around 10,000 K, and the plasma is at equilibrium. Plasma gas flow rates in this source are high, typically around 100 liters per minute. The pressures within the reactor are slightly below atmospheric (always above 4 kPa (30 Torr); 13.8 and 55.2 KPa (414 Torr) are common values used). The first and second steps (10 and 20) described above are performed in one single run without opening the reactor, and the product obtained is ready for dispersion. Total run time of both stages is less than one hour and in a preferred embodiment is 30 to 45 minutes, and in a particularly preferred embodiment is approximately 30 minutes.

The oxygen functionalization step 20 of the present invention, surprisingly and selectively adds oxygen functionalities on the GNF from zero to a specific level. This is in contrast to the prior art that first produces graphene from strongly oxidized graphite to exfoliated graphene structures (called graphene oxide (GO)), and then reduces the graphene oxide to remove part of the oxygen (called a reduced graphene oxide (RGO)). The state of the art technology introduces a very high concentration of defects on the graphene structure throughout the various processing steps. One signature of the high defect concentration is observed on Raman spectroscopy spectra.

Figure 2:
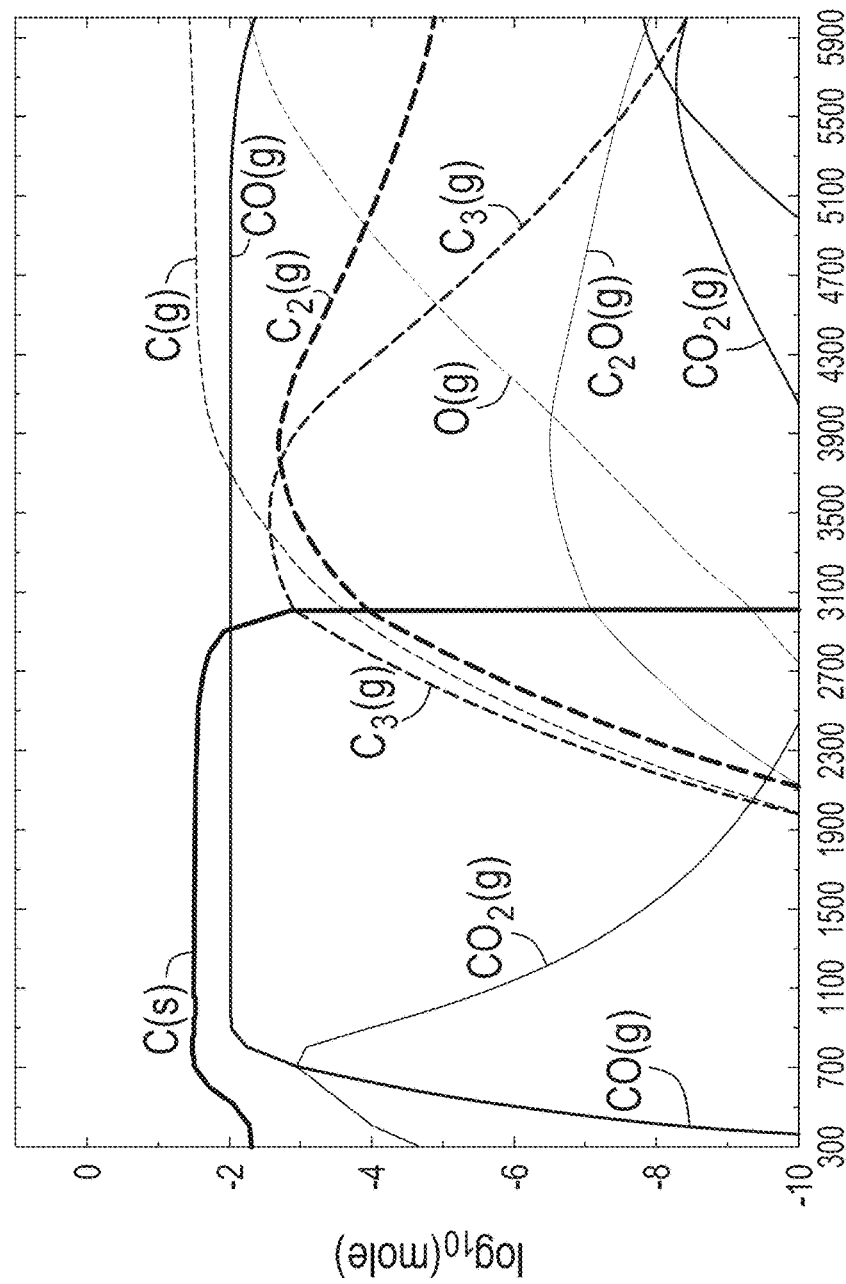
FIG. 2 is a theoretical equilibrium thermodynamic diagram of calculated concentration of expected CO, $CO_2$ and C species versus temperature (K) of a plasma system operating with Ar, $CH_4$, $N_2$, and $O_2$ at 0.55 atm and for a temperature range from 300 K to 5900 K, where the figure only shows CO, $CO_2$ and C species.

The oxygen functionalization stage 20 results obtained for O-GNF or O/N-GNF without affecting the structure of the GNF and its crystallinity are not obvious. Equilibrium thermodynamic calculations are represented in FIG. 2 and illustrate that CO, $CO_2$ and C species are expected. These calculations indicate that oxygen should burn the carbon particles and modify the GNF structures completely, transforming most of the carbon particles into gaseous carbon oxides (CO, $CO_2$). However the present inventors have found that surprisingly the expected loss of GNF into gaseous carbon oxides and associated transformation of the GNF structure does not occur. Part of the GNFs are effectively lost, as evidenced in Table 2, where the mass of GNF collected after stage 20 (yield line in milligrams ($10^{-3}$ g) of GNF collected after stage 20), indicate a decrease of the GNF mass produced when the level of O-functionalities is higher upon an increase in functionalization time; A compared to B, and C compared to D. Most probably the GNFs loss is induced by both effects of gas entrainment and reactions with oxygen.

Figure 3A:
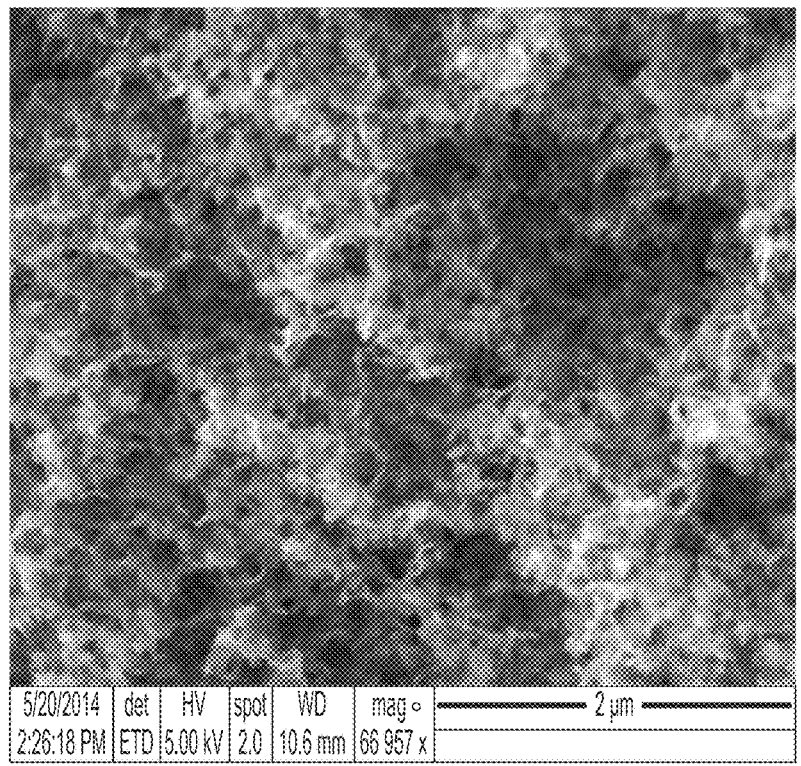
FIG. 3A are Scanning Electron Microscopy (SEM) micrographs of Nitrogen Functionalized-GNFs according to one embodiment of the present invention.
Figure 3B:
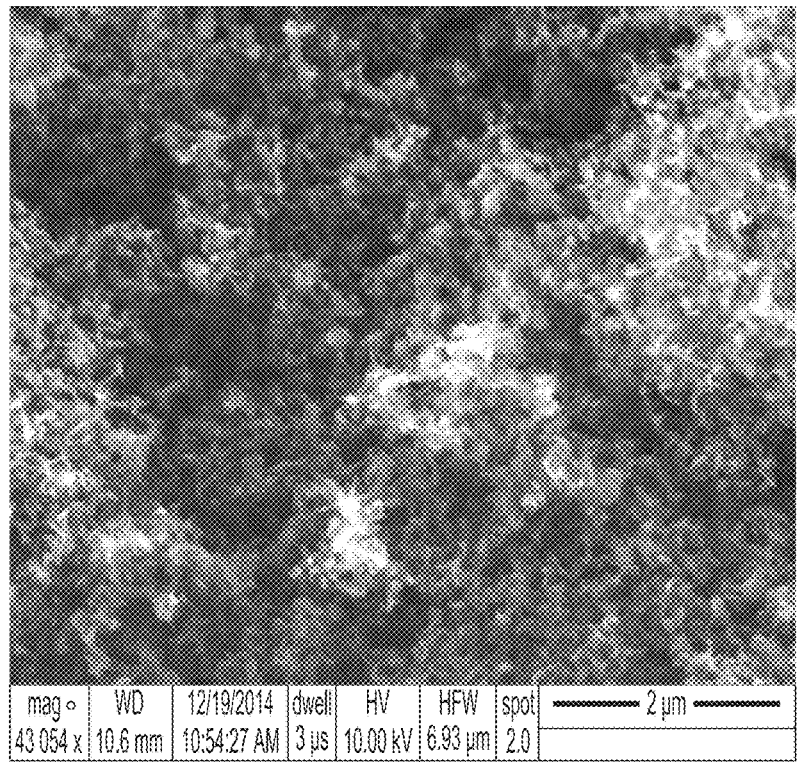
FIG. 3B are Scanning Electron Microscopy (SEM) micrographs of Oxygen Functionalized-O-GNFs according to another embodiment of the present invention (for an oxygen functionalization step occurring at 55.2 kPa/20 kW for 10 min, for a length scale of 2 μm) wherein FIGS. 3a) and 3b) illustrate that the two GNFs are very similar with no structural/morphological differences following the O-functionalization step are visible.

The key points concerning the oxygen functionalization are that the GNFs: (a) before the oxygen functionalization step 20 (FIG. 3A) and after the oxygen functionalization step (FIG. 3B) have the electron microscopy images that show essentially no difference in morphology, i.e. no structural changes observed, no presence and no generation of amorphous carbon, and a similar very open porosity of the structure conserving its very "fluffy-like" appearance; and (b) a well graphitized structure, in other words a highly crystalline structure is maintained as shown by the Raman spectra of FIG. 4 giving the same sharp Raman peak signature before (bottom curve) and after (top curve) functionalization.

Figure 4:
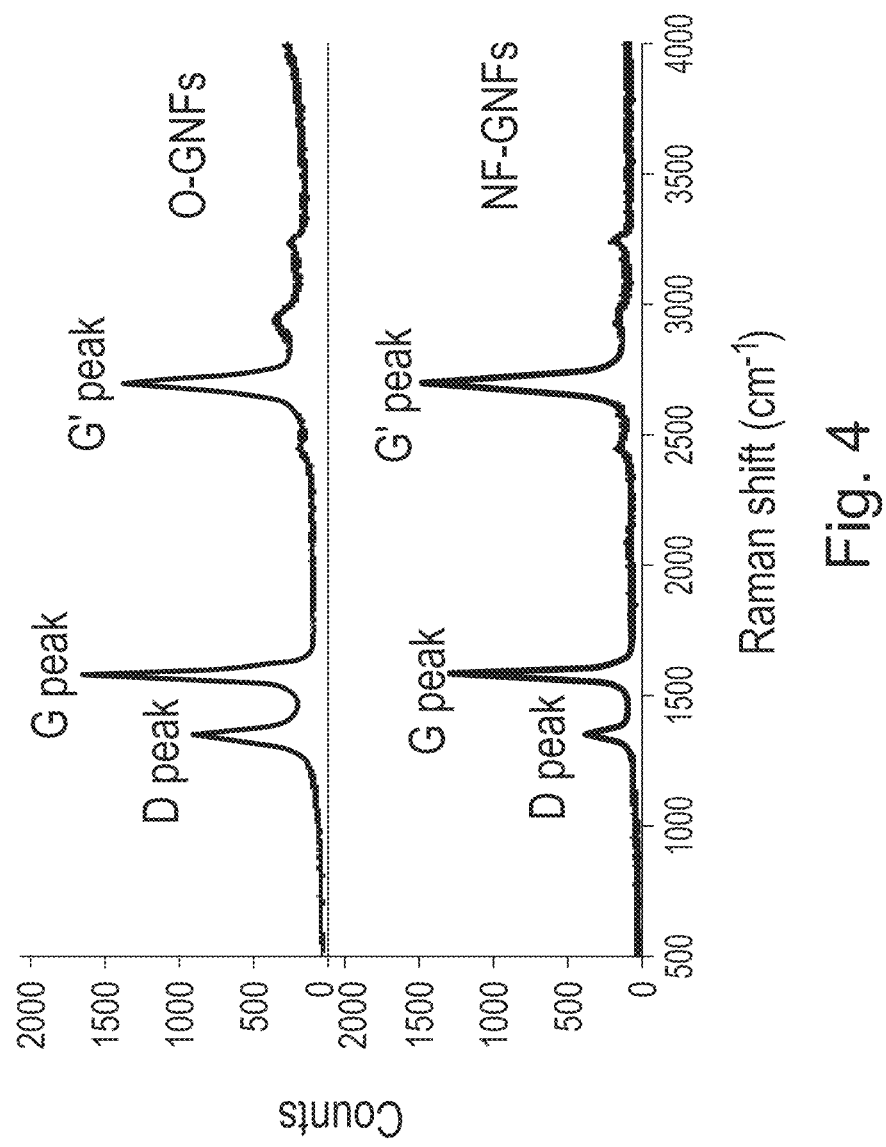
FIG. 4 are Raman spectrum of O-GNFs at 14.2 at % of oxygen produced according to FIG. 1 compared with Nitrogen Functionalized-GNFs.

In contrast, the signature of an amorphous carbon structure is known to be a single and very broad peak that is broader than, and covering entirety the three D, G and G' peaks shown on FIG. 4. Furthermore, the intensity ratios of the D (defect-related), G and G' (graphitic-related) peaks are used in the literature as a purity index and to give indications on some typical length scales of the well crystalline sheet zones present on the structure.

The purity index is maintained at a high value which is well above 1, that indicates strong graphite-type crystallinity with low defects. This information is given in Table 3. The two length factors, particularly the most important one $L_{eq}$ giving an equivalent length of the curved graphene sheets, have decreased slightly but are still very high as the normal $L_{eq}$ for essentially all carbon powders are well below 6 nm. The inventors believe that only the present GNF structures have $L_{eq}$ ranging above 30 nm when non-functionalized, and still above 14 nm when functionalized; the $L_{eq}$ lengths for state-of-the-art reduced graphene oxides (RGO) are little known or publicized—with an $L_{eq}$ expected to be well below 10. The reason for the reduction of $L_{eq}$ is simple, as the state-of-the-art method of fabrication tends to destroy the good crystallinity of the RGOs.

The method of oxygen functionalization of GNF 20 uses a single reactor 5 with an expansion zone, to provide functional species to the powders deposited on surfaces that include the wall of the reactor 5 and the downstream collection plate. The plasma generated by the inductively coupled plasma torch (ICP) is a thermal plasma, which means a thermodynamic equilibrium is reached in a high temperature section of the reactor roughly in the 5,000-10,000 K zone from inside the ICP torch and downstream to roughly the GNF synthesis region. Thermodynamic equilibrium means more particularly in the plasma field that the electron cloud has the same temperature as all the other species (atoms, ions, molecules). In other thermal plasma reactors, the electrons will recombine with the ions very rapidly in a narrow zone downstream of the thermal plasma zone; this is called the "plasma recombination zone".

With the present process, the reactor geometry is set for a well-controlled radial expansion of the plasma jet away from jet axis by increasing the reactor diameter using a conical geometry with a half angle of 7°. The reactor design is set out in at paragraph [00044] of WO2014/000108 A1, incorporated herein by reference. The flow field pattern, the energy field (temperature), and the pressure/power conditions are set so that the plasma recombination zone is expanded downstream to the collecting plate and close to the side wall. This makes available excited and reactive species (atomic/molecular excited species, radicals, ions) that would not be present at the low temperature locations to where the GNF have been deposited in the 1st stage. A normal air plasma for example would not contain any O+ ions below 5,000 K, and similarly very little atomic oxygen (O, and O*, where the * represents excited oxygen species which are very reactive) and excited molecular oxygen ($O_2^*$) at temperatures below 2,500 K. The present reactor expansion and operating conditions stretch the zone of existence of these species down to the GNF surfaces at low temperature. Surprisingly, the reactions generated do not overheat and degrade the GNF; these are rapid at the GNF surface and are forming primary bonds of oxygen attached on carbon.

Figure 5A:
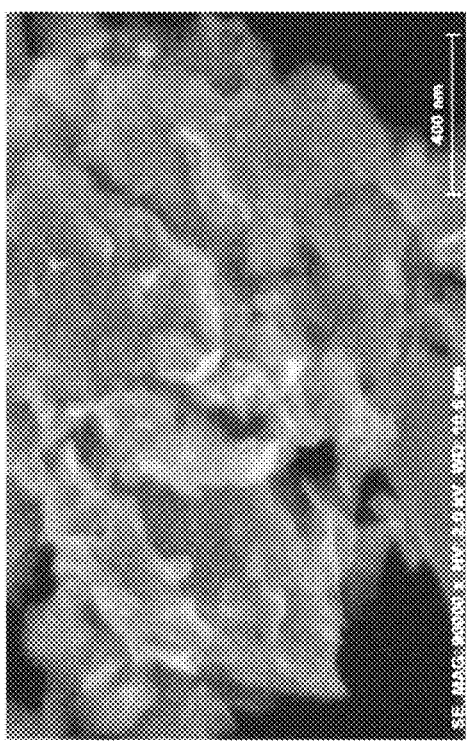
FIG. 5A is a high resolution SEM images of a post-treated GNF structure following the addition of Fe to the N-GNF structure initially generated in the thermal plasma reactor according to one embodiment of the present invention; showing the GNF structure after post-treatment made to introduce Fe.
Figure 5C:
FIG. 5C is a high resolution SEM images of a post-treated GNF structure following the addition of Fe to the N-GNF structure initially generated in the thermal plasma reactor according to one embodiment of the present invention; showing the distribution of O-functionalization (distributed on surface) introduced during the plasma treatment.
Figure 5B:
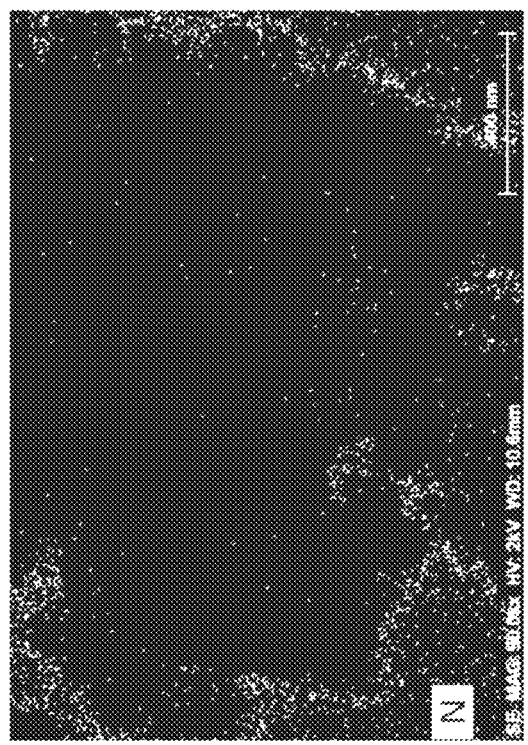
FIG. 5B is a high resolution SEM images of a post-treated GNF structure following the addition of Fe to the N-GNF structure initially generated in the thermal plasma reactor according to one embodiment of the present invention; showing the distribution of the N-functionalization (distributed on surrounding edges) introduced during the plasma treatment.

As previously mentioned, the structure of the GNF involves typically 10 graphene layers (observed range is from 5 to 20 layers or atomic planes). Only the surface is being functionalized with oxygen, leaving the internal layers unaffected and maintaining their properties. This is in contrast to state-of-the-art RGO which normally has a very thin structure of 1-3 layers, the oxide formation/reduction process strongly affecting the overall structure. Again, the nitrogen functionalization on the O-GNF described herein is seen to occur mainly on the surrounding edges of the graphene sheets, whereas the oxygen functional bonds are seen to be dispersed quite evenly on the 2D surface of the graphene sheets (FIG. 5). This is unexpected and probably due to the higher reactivity of the excited oxygen species. It is also very interesting as the oxygen on the surface of the GNF provides the polar groups that improve solubility, while nitrogen provides the basic units required for catalysis; with the oxygen and nitrogen functionalization seemingly not interfering with the other's specific properties of the GNF.

Several conditions were tested to determine the influence on the oxygen incorporation/functionalization on the GNFs and on the dispersion quality. The power delivered to the plasma and the pressure in the reactor during the functionalization step was either 20 kW/55.2 kPa (8 psia), which corresponds to the conditions of GNF growth, or 25 kW/13.8 kPa (2 psia). The duration of the oxygen functionalization step was established, with 'short' functionalization periods preferred that produce low oxygen content functionalized graphene nanoparticles 26, while 'longer' time would allow the oxygen to consume the deposited GNFs. The conditions used throughout the functionalization step are listed in Table 1.

Thus the overall process 1 the first two steps of which occur in a single reactor, is favoured over a single-stage process of the prior art. In the prior art, process air is injected simultaneously with the carbon source, and the oxygen from the air consumes the carbon and produces carbon monoxide and carbon dioxide instead of GNFs; this was observed experimentally and evaluated using equilibrium thermodynamic calculations.

TABLE 1

Conditions for the oxygen functionalization step.

| Samples | Pressure/Power conditions | Duration of the functionalization |
| --- | --- | --- |
| A | 55.2 kPa/20 kW | 10 min |
| B | 55.2 kPa/20 kW | 20 min |
| C | 13.8 kPa/25 kW | 10 min |
| D | 13.8 kPa/25 kW | 5 min |

The powders were collected and weighed to obtain the yield of both non-functionalized GNFs (NF-GNFs) and oxygen functionalized GNFs (O-GNFs), knowing that a batch of NF-GNFs from the initial nucleation step yields approximately 200 mg.

Returning to FIG. 1, the overall process 1 may include a third step 30, where a surfactant-free polar solvent dispersion/suspension 36 of the oxygen-functionalized GNF/nanofluid is produced. The oxygen-functionalized GNF 26 is cooled for period of at least 15 minutes. The reactor is opened and the O-GNF powders are collected and added directly to a polar solvent 32 in a desired mass/liquid ratio. In a preferred embodiment, the polar solvent 32 is: de-ionized water, an aqueous $NaHCO_3$ solution, $C_{1-4}$ alcohol, acetone, other polar solvents or combinations thereof. In a particularly preferred embodiment, the polar solvent is selected from the group consisting of water, an aqueous NaHCO$_3$ solution, ethanol, and combinations thereof.

The GNF-nanofluid dispersion 36 is instantly formed upon addition to the polar fluid, and the GNF powders are fully dispersed in the fluid, no particles are visible as the nano-particles are too small, only a darkening of the fluid is seen according to the GNF concentration. The GNF nanofluid dispersion 36 is surfactant-free and requires no surfactants to disperse the O-GNFs or for stability. The functionalized graphene nanoflakes described herein are fully dispersed that is, the O-GNF do not agglomerate and/or are suspended in a homogeneous liquid-solid particle mix in the nanofluid.

Various concentrations of the O-GNF dispersion from 5, 10, 25, 50, 100 to 200 mg/L were successfully prepared. As one reaches 25-50 mg O-GNF/L, the nanofluid takes the form of a totally opaque ink. No sedimentation has been observed after 3 months.

Dispersion tests were realized in water and ethanol. The tests were conducted using 5 mg of powder from the different tested conditions and 8 mL of solvent (0.25 mg powder/mL solvent). The stability of the dispersion in water was measured by zeta potential, while the stability in ethanol was observed visually.

X-ray photoelectron spectroscopy (XPS) was done on a VG Scientific ESCALAB MK II, operating at a pressure of $10^{-9}$ torr, and using an aluminium X-ray source. Zeta potential was measured on a Zetasizer Nano ZS from Malvern. Scanning Electron Microscopy (SEM) was performed on a FEI Inspect F-50 FE-SEM. The Raman instrument used was an inVia Reflex confocal micro-Raman (Renishaw) with a laser emitting at a wavelength of 514.5 nm.

A. Oxygen Content

Figure 6:
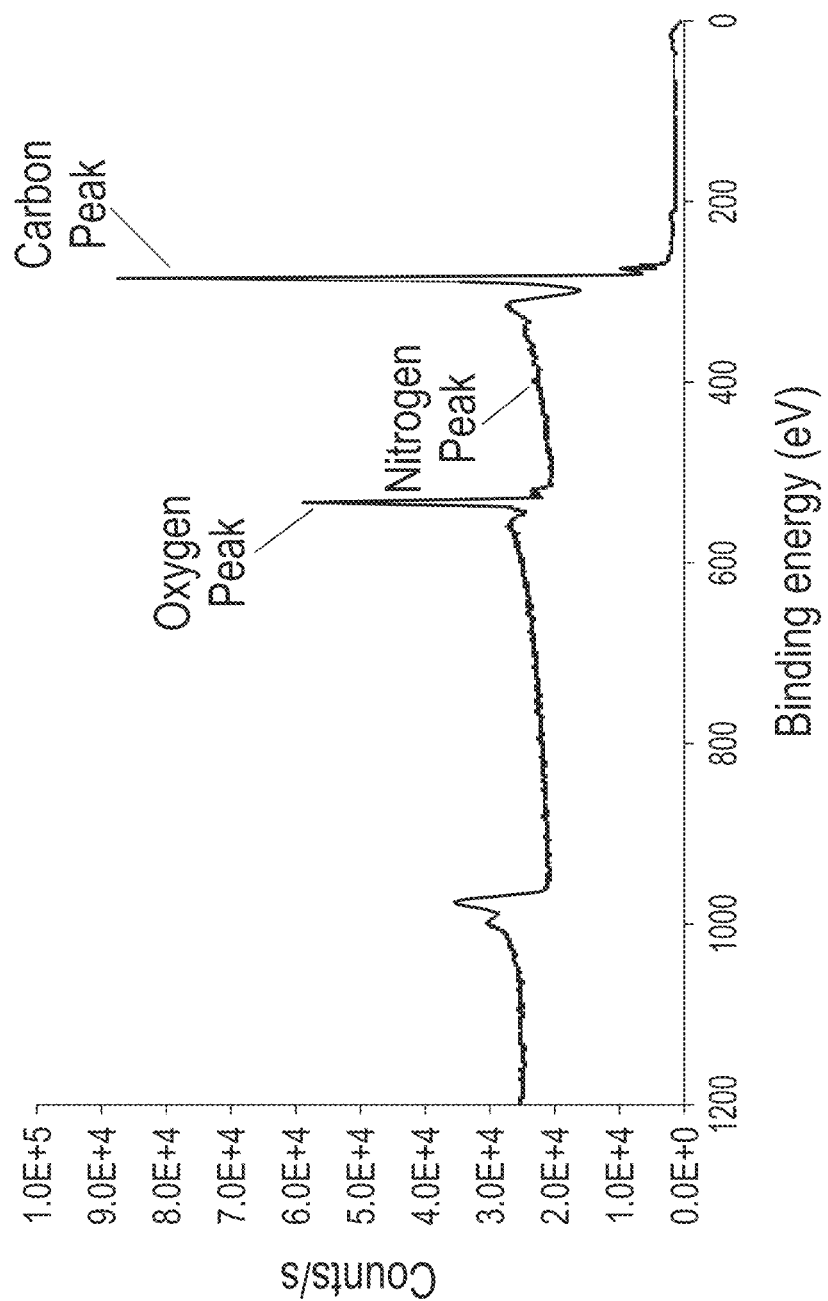
FIG. 6 is an X-ray photoelectron spectroscopy (XPS) survey scan of one embodiment of O-GNFs functionalized in 13.8 kPa/25 kW argon plasma during 10 minutes (Sample C), indicating the presence of oxygen on the GNFs from the strong oxygen peak.

XPS was used to determine the atomic composition of the O-GNFs surface. This non-destructive technique gives information on the elemental composition of the first few nanometers at the surface of the sample. While the GNFs are oriented in all the directions, XPS gives a good average for the atomic composition. The XPS survey for O-GNFs functionalized in a 13.8 kPa/25 kW argon plasma during 10 min shows the carbon and oxygen peak, with some traces of nitrogen (FIG. 6).

The oxygen content was found to be up to 14.2 at. %, while the usual content for N-GNFs is approximately between 1 and 2 at. %, and originates mainly from the GNF nucleation stage 10 made with nitrogen. The oxygen contents for all of the samples, as well as their yields, are summarized in Table 2. The samples having the highest oxygen contents, 13.9 and 14.2 at %.O respectively, showed a loss in yield by the end of the oxygen functionalization step; a 74% and 44% loss based on a normal batch of 200 mg of GNFs.

TABLE 2

Yields and atomic composition after oxygen functionalization.

| | Sample | | | |
|---|---|---|---|---|
| | A | B | C | D |
| Yield (mg) | 196.6 | 52.5 | 111.7 | 205 |
| C at % | 98.1 | 85.3 | 84.9 | 92.8 |
| N at % | 0.6 | 0.8 | 0.9 | 0.8 |
| O at % | 1.3 | 13.9 | 14.2 | 6.4 |

The oxygen and carbon peaks were studied in more detail through a deconvolution using Gaussian-Lorentzian peaks. This analysis extracts the state(s) of the element, and the functional groups formed with that element can be retrieved.

Figure 7:
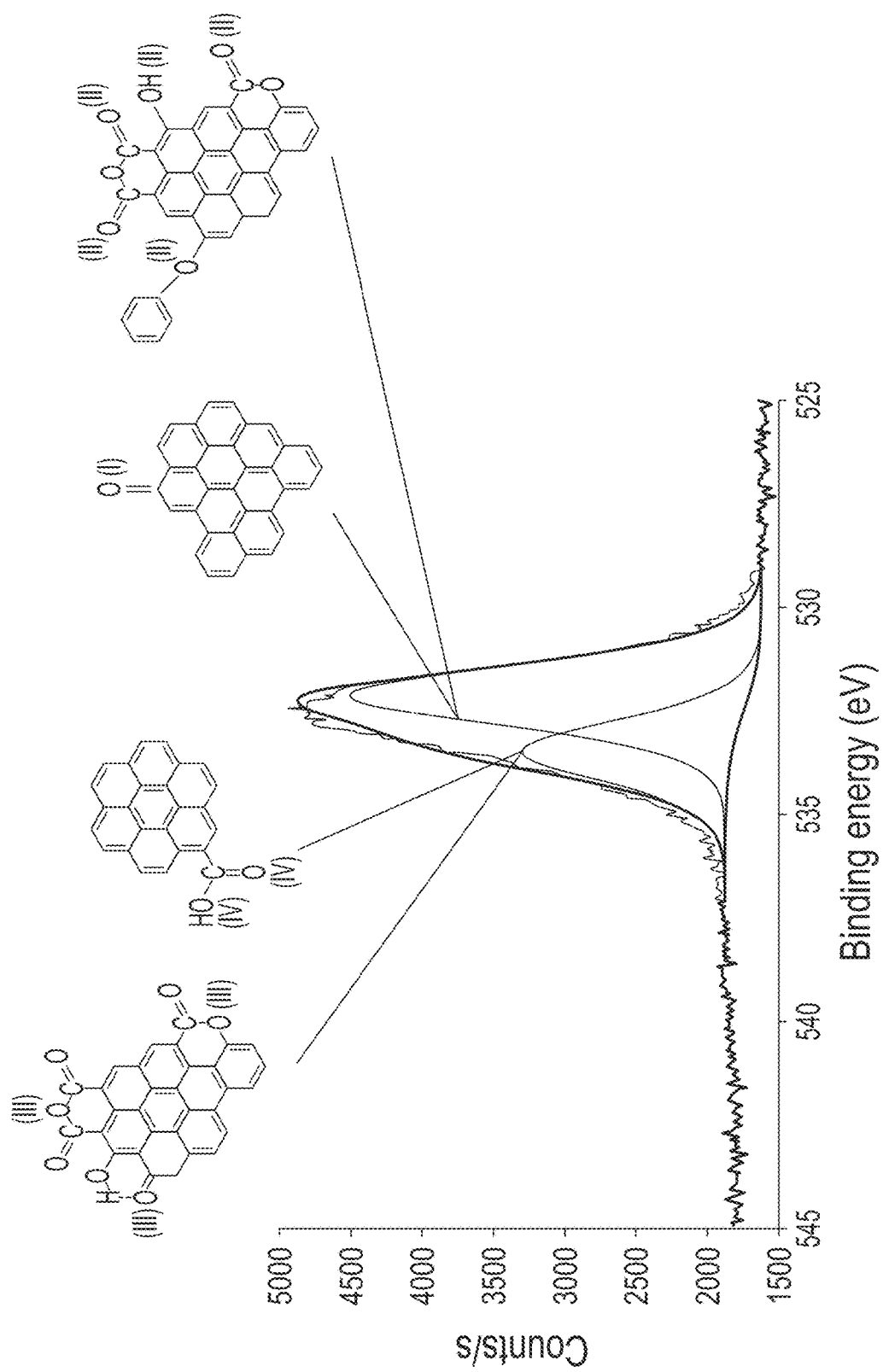
FIG. 7 is a high resolution and deconvolution of oxygen peak and deconvolution for O-GNFs functionalized according to FIG. 6, with the chemical structures corresponding to the two deconvoluted peaks indicating the oxygen is added to GNF through primary chemical bonds.

The deconvolution of oxygen and carbon peaks is presented here for sample C, which gave the best result in terms of oxygen content and yield. In examining the oxygen peak (FIG. 7), it appears that the main binding energies involved for the oxygen are 532.1 and 533.3 eV. These energies are associated with carbonyl oxygen in ester, anhydrides, oxygen atoms in hydroxyls or ester for 532.1 eV, and ether oxygen atoms in esters and anhydrides for 533.3 eV [5]. While the GNFs are mainly graphitic-shaped, the hydrophilic groups must be formed on the edges of the nanoparticles, and on the structural defects all over the surface.

The deconvolution of the carbon peak (FIG. 8) confirms the presence of the hydrophilic groups with the peaks at 285.5, 287.7, and 286.7 eV corresponding respectively with C—O, C=O, and O=C—O groups. A high number of hydrophilic groups on the O-GNFs would allow them to be perfectly dispersed in a polar solvent.

B. Dispersion Tests

Figure 9:
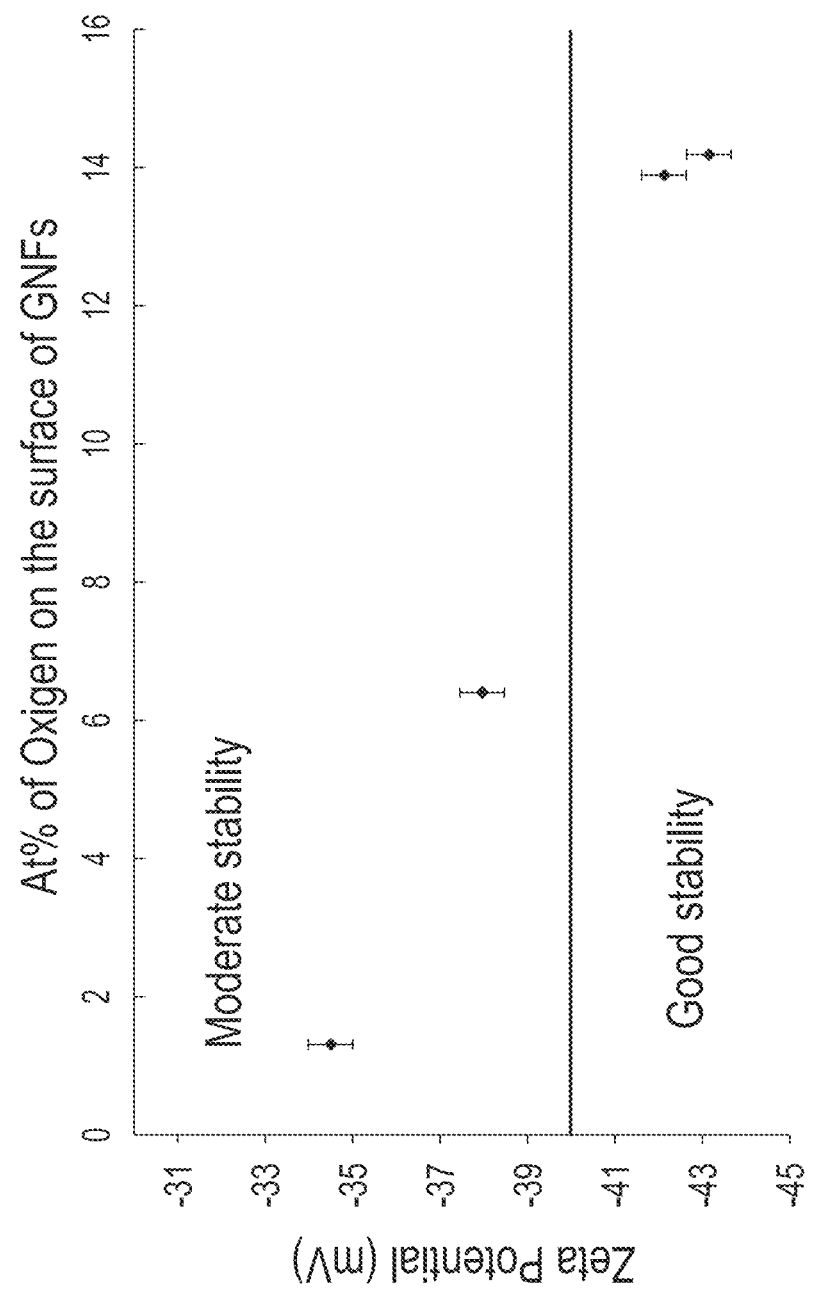
FIG. 9 are Zeta potential measurements for the O-GNFs prepared according to the present invention prepared in a 1 mM $NaHCO_3$ solution.
Figure 10:
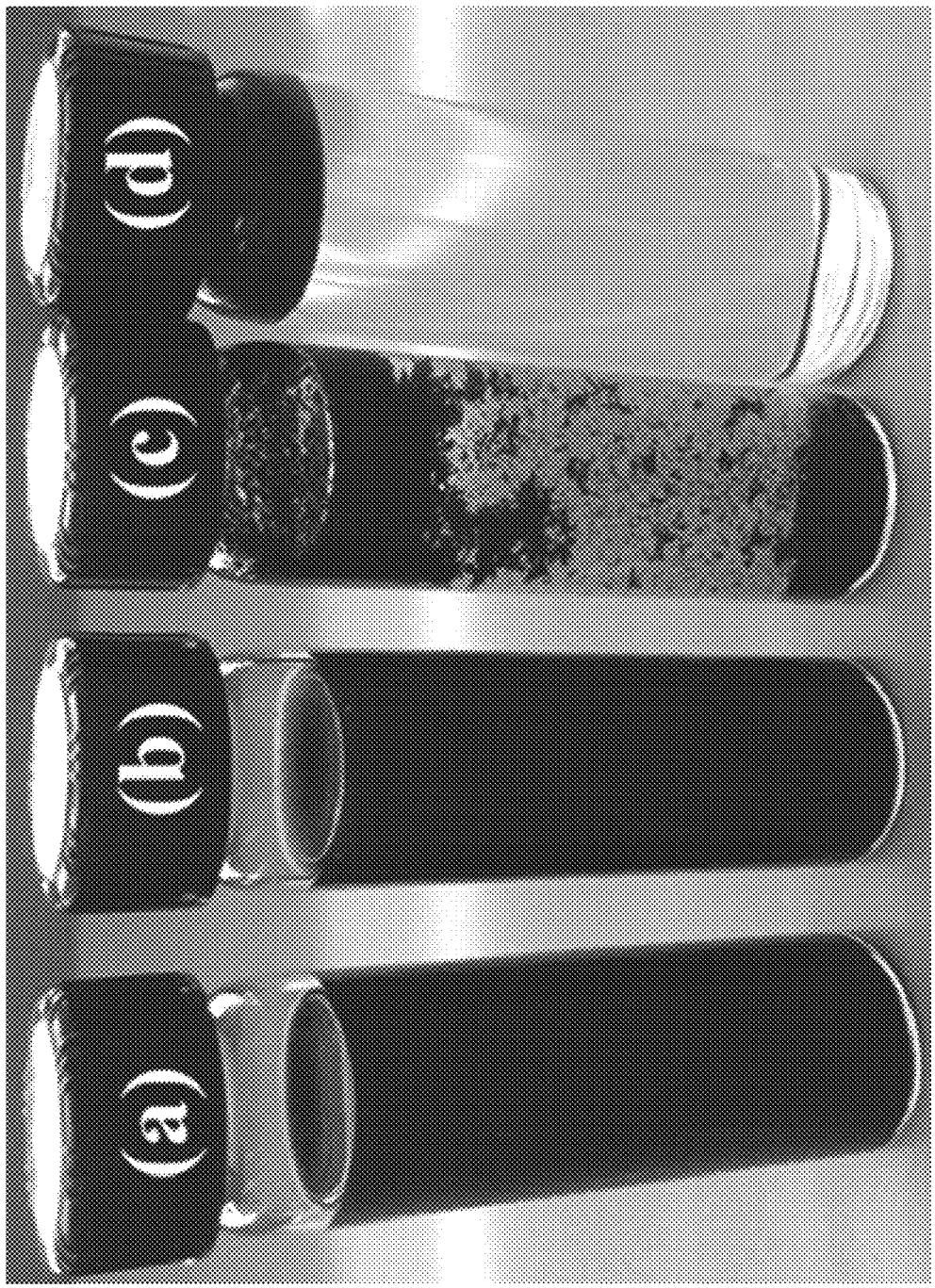
FIG. 10 is a photograph of various suspension indicating the stability of the suspension after 6 weeks for a) GNFs with 14.2 at % Oxygen in ethanol b) GNFs with 14.2 at % Oxygen in water c) GNFs with 6.4 at % Oxygen in water and d) NF-GNFs in water.

It has already been shown that in the presence of water, the NF-GNFs do not mix at all and stay at the surface of the liquid. However, when functionalized with oxygen, the O-GNFs with oxygen contents of 14.2 and 13.9 at % mixed perfectly with water as is illustrated in FIG. 10. To measure the stability in water, the zeta potential was measured on all the prepared samples (FIG. 9). Zeta potential enables a quantification of the stability of a suspension by measuring the electrophoretic mobility of particles in suspension. It is commonly accepted that a zeta potential of less than −40 mV (or more than +40 mV) denotes a good stability. A suspension having a zeta potential between ±10 and ±30 mV is considered as moderately stable. However, for samples having a zeta potential in this range, an agglomeration occurring over time has been observed.

From past work, it is known that when NF-GNFs are mixed with ethanol, there is very little stability and the material settles to the bottom after a couple of minutes. The O-GNFs with higher oxygen content produced in this work do not exhibit the same behaviour, and instead show excellent stability in both water and ethanol for long time periods. To further confirm this, samples were left undisturbed for 3 months and then observed visually (FIG. 10) The stability of the O-GNF dispersion/suspension has now been established for 1 year.

Dispersion tests and visual observation showed that only the samples with the highest oxygen content can be perfectly mixed with water and ethanol. Their stability can be attributed to their high oxygen content, which is directly related to the number of hydrophilic groups surrounding the nanoparticles. If the number of hydrophilic groups is insufficient, the stability of the nanoparticles in water is eventually lost.

C. Homogeneity and Crystallinity

The samples functionalized with the different conditions were analysed by SEM and compared to NF-GNFs (FIG. 3). The O-GNF samples showed the same appearance as the NF-GNFs. It is important to note the absence of any amorphous carbon or polymer in the samples, thus demonstrating the purity of the O-GNFs.

While SEM allows preliminary analysis on the overall sample, Raman spectra (FIG. 7) gives concrete parameters to evaluate the graphitisation of GNFs. When analysing carbon-based samples, three peaks need to be examined. The D peak, found in the 1250 to 1450 cm$^{-1}$ range, provides information on non-graphitized carbon, while the G peak, in the 1500 to 1700 cm$^{-1}$ range, is associated to the graphitic content of the sample. Finally, the G' peak in the 2550 and 2850 cm$^{-1}$ range becomes sharper and intensifies as the number of graphene layers increases. The purity, the crystallite size (La), and the average length of graphene planes (Leq) are all relations defined by Larouche et al. [6] and can be deduced from the intensity and the underlying area from the three peaks (Table 3). The Raman spectra obtained for NF-GNFs and Sample C are also presented (FIG. 4).

TABLE 3

Graphitic indices relations

| Indices | Formula | NF-GNFs | Sample C |
| --- | --- | --- | --- |
| Purity | $I_G/I_D$ | 2.83 ± 0.56 | 1.92 ± 0.17 |
| $L_a$ (nm) | 4.44 × $A_G/A_D$ | 8.76 ± 0.93 | 6.24 ± 0.29 |
| $L_{eq}$ (nm) | 8.8 × $A_G/A_D$ | 28.16 ± 5.34 | 14.50 ± 1.65 |

It can be inferred from the graphitic indices that O-GNFs still have a graphitic structure. However, the oxygen functionalization causes partial damage to the structure of the O-GNFs, by decreasing the purity, the length of the crystallite and the average length of the graphene planes, and so increasing the defects.

The surface oxygen functionalization step with an argon-air plasma, of hydrophobic GNFs makes them hydrophilic, and stable in a suspension, with a solvent such as water, or ethanol. This study was made to facilitate the use of wet chemical methods on GNFs for catalytic applications; however a large series of other potential applications can be considered for this type of nanofluid.

The O-GNF of the present invention are pure in fluid and require no stabilizing agent to maintain dispersion. The O-GNF of the present invention can be used as-produced in many applications (example: polyvinyl alcohol (PVA)-nanocomposites, or polyethelene glycol (PEG) coated GNF for bio-applications), the present O-GNF enable the true nanoscale properties instead of NP-agglomerate properties. The stable O-GNF dispersion described herein forms an ink based on graphene structures, which can be then serve in applications such as catalysis and printing or patterning processes making use of the specific graphene properties such as electrical and thermal transport properties, or as structures transporting other chemical functionalities or nanoparticles.

Comparison of O-GNF Nanofluid with Commercially Available Products:

The following provides the measurement results of important physical and chemical parameters describing graphene based nanofluids, making a comparison of the current O-GNF nanofluid with six (6) of the most important commercially available graphene nanofluids available on the market. These commercially available nanofluids are labeled A, B, C, D, E and F.

The Commercial Graphenes are:
A: Edge Oxidized graphene powder and suspension from Sigma Aldrich;
B: Graphene Nano Powder from Graphene Supermarket;
C: Graphene Oxide from Sigma Aldrich;
D: Nano graphene oxide from Graphene Supermarket;
E: High surface area Reduced Graphene Oxide from Graphene Supermarket; and
F: Graphene nanofluid from US-Nano.

Existing products on the market show limitations for graphene nanofluids to be fully exploited, among the most important ones are: a) the quality of the dispersion in the nanofluid, b) the stability of the dispersion for minimal agglomeration and sedimentation of the nanoparticles over time, c) the crystallinity and purity of the graphene itself, and d) the resistance of the nanofluid to higher temperatures. The paragraphs below provide a short description of the measured parameters corresponding to the above properties, and values measured which all indicate superior and generally exceptional performance of O-GNF compared to the commercial products.

(a) Quality of Dispersion and (b) Stability:

The quality of the dispersion refers to the level individual graphene nanoparticles are dispersed in the host fluid. In particular one tries to avoid a dispersion made of agglomerates of graphene particles rather than of individual graphene nanoparticles. Visual observation of the nanofluid for a specific graphene mass loading (mg of graphene/liter of fluid) provides a very good insight of the dispersion quality as graphene has strong light absorption characteristics (see FIGS. 12A to 12C). The measurement of the radiation being absorbed within the nanofluid using UV-Visible spectroscopy (200 to 900 nm) provides accurate data of this dispersion. Evaluations of this absorption as a function of wavelength (not shown here) show systematically a stronger absorption of the O-GNF by a factor 2 to 5. Such radiation absorption is evaluated after various time intervals to yield the stability level of this dispersion over time (see FIG. 13). One last measurement (not shown here) is scanning electron microscopy (SEM) of the graphene structures left after deposition and drying of the nanofluid on a surface. These show systematically a well dispersed structure of the O-GNF when compared to the strongly agglomerated commercial structures, a result well in line with what is observed in the figures below.

FIGS. 12A, 12B and 12C compare visually the dispersion quality of O-GNF with the commercial products at different concentrations (25, 50 and 100 mg/L). The O-GNF dispersions appear completely black even at the lowest loading, indicating a full dispersion absorbing all incoming radiation even at very low loading. All commercial products show relatively clear, semi-transparent fluids at same loadings, indicating these nanofluids are in fact dispersions of agglomerates of graphene structures rather than individual graphene nanoparticles being dispersed.

Figure 13:
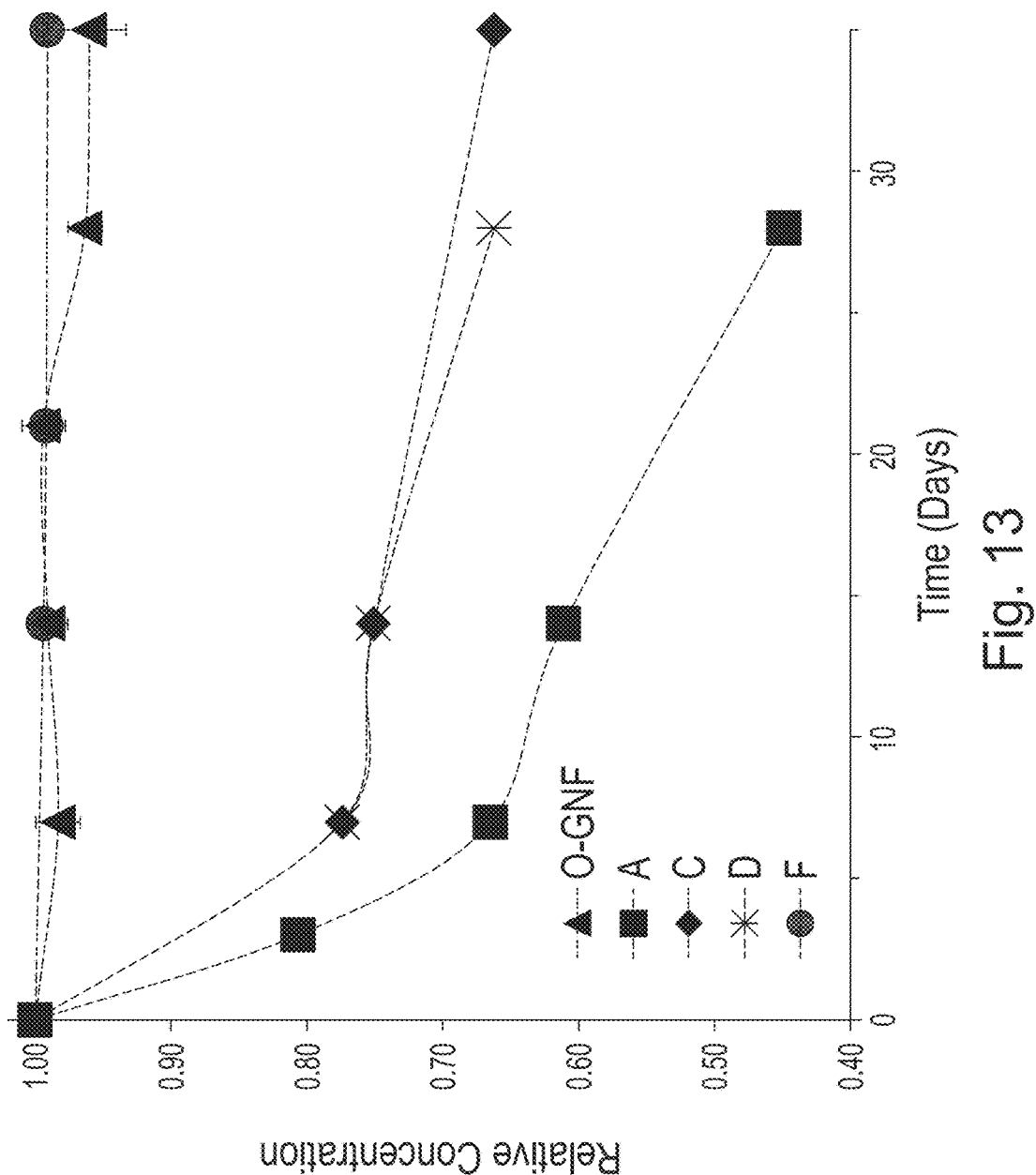
FIG. 13. is a graph of relative concentration normalized to the nanofluid concentration at time zero vs. Time (days) illustrating the evolution of the nanofluid stabilities over time using UV-Visible spectroscopy and the Beer-Lambert law.
Figure 14A:
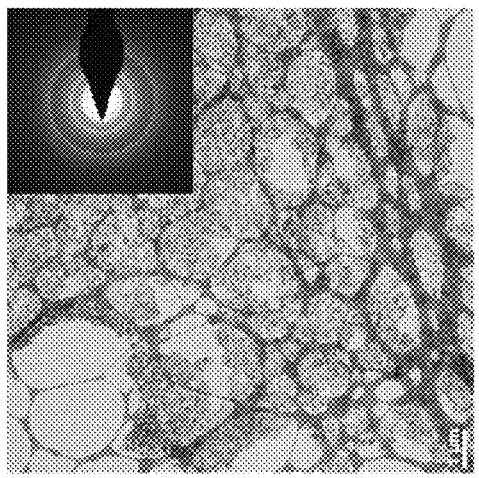
FIG. 14A is a transmission electron microscopy (TEM) image at 1 μm resolution for O-GNF structures showing the level and quality of crystallinity and a series of relatively independent structures for the O-GNF.
Figure 14B:
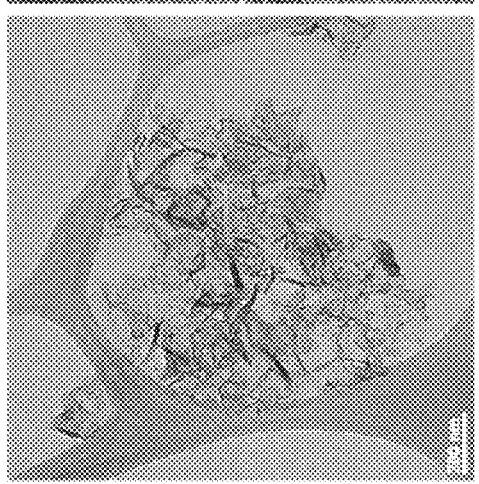
FIG. 14B is a transmission electron microscopy (TEM) image at 200 nm resolution for O-GNF structures showing the level and quality of crystallinity and a series of relatively independent structures for the O-GNF.
Figure 14C:
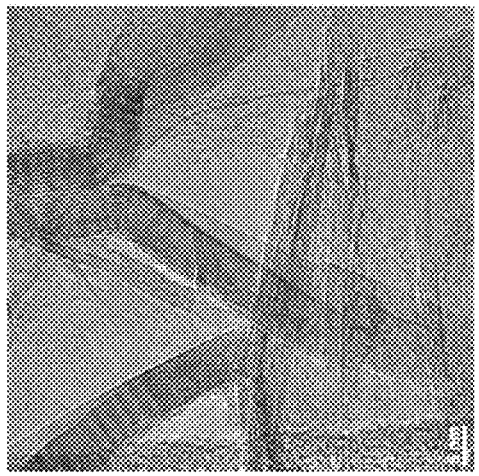
FIG. 14C is a transmission electron microscopy (TEM) image at 5 nm resolution for O-GNF structures showing level and quality of crystallinity, in this micrograph the O-GNF clearly showing the stacked atomic planes.
Figure 14D:
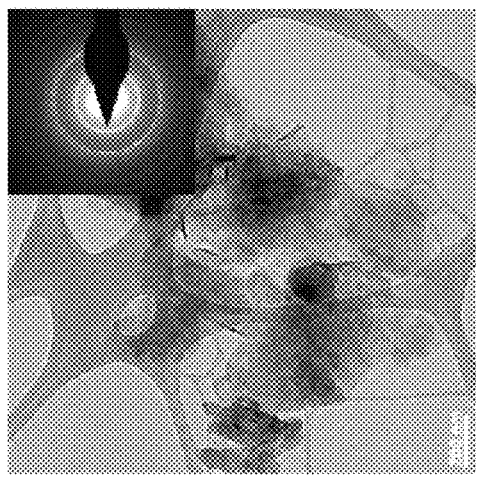
FIG. 14D is a transmission electron microscopy (TEM) image at 1 μm resolution for material A (Edge Oxidized graphene powder and suspension from Sigma Aldrich) showing agglomerated structures.
Figure 14E:
FIG. 14E is a transmission electron microscopy (TEM) image at 200 nm resolution for material A (Edge Oxidized graphene powder and suspension from Sigma Aldrich) showing agglomerated structures.
Figure 14F:
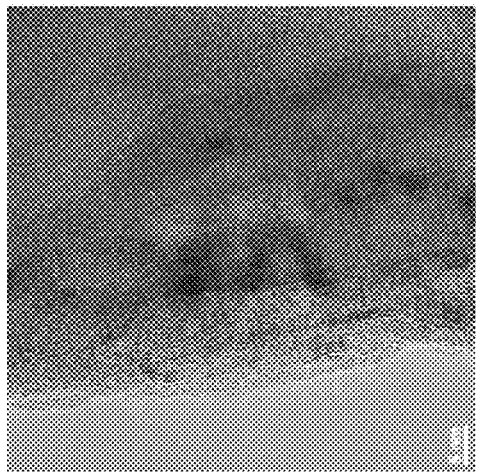
FIG. 14F is a transmission electron microscopy (TEM) image at 5 nm resolution for material A (Edge Oxidized graphene powder and suspension from Sigma Aldrich) showing agglomerated structures, and a significant level of disorder of the carbon structure indicative of a low quality of crystallinity.

FIG. 13 provides the stability curves of the different nanofluids based on the evolution of the radiation being absorbed in the nanofluid over time. All these curves are normalized to the level of radiation observed on the specific nanofluid at time zero. Only nanofluid F provides stability of the same order as the O-GNF, other nanofluids showing relatively rapid agglomeration and sedimentation. One should note however for nanofluid F that all other indicators of performance (Quality of dispersion as seen in FIG. 12C; Crystallinity and thermal resistance as will be seen below) are relatively poor.

(c) Crystallinity and Purity of the Graphene:

The crystallinity of the graphene material correlates directly with the performance of the product in electrical and thermal conductivity. Graphene containing a large number of defects will have performances closer to amorphous carbon. In fact the word "graphene" is often misused in view of the very large number of defects often observed in some of these materials; by definition graphene is a crystalline structure with a relatively small number of individual graphene planes.

Evaluation of crystallinity is made first through direct observation of the graphene particles using transmission electron microscopy (TEM) in order to reveal the well aligned individual crystal planes (see FIGS. 14A to 14F below). A second measurement, Raman spectroscopy, provides some parameters on the quality of the carbon crystal structure and the purity based on the relative level of defects present on the structures. These parameters evolve from the specific shape and relative intensity of three main spectral peaks characterizing carbon materials. All comparative evaluations based on Raman spectroscopy systematically indicate larger crystallinity parameters and lower defect content of the O-GNF compared to commercial products (curves not shown here).

FIG. 14 provides comparative examples of transmission electron microscopy (TEM) images (FIGS. 14A to 14C) of O-GNF and (FIGS. 14D to 14F) representative commercial products. One can see the series of well aligned atomic planes on the O-GNF, while all the commercial graphene have very strong components of disordered structures often to the point the aligned graphene structures are not observed. It is to be highlighted here that the very high temperature production method of O-GNF based on gas phase nucleation is at the basis of this high crystallinity, while the commercial structures are typically generated from creating a very large number of defects on graphite through oxidation for achieving the exfoliation, and then removing the oxygen. The very high crystallinity of O-GNF is an intrinsic result of the fabrication method.

(d) Resistance to High Temperature

The resistance of the nanofluid to high temperature provides first some signature of the type of chemical structure (bonding) enabling dispersion in a polar fluid such as water, and has important implications in many specific applications occurring at higher temperatures. The O-GNF structure is the only known nanofluid that can be boiled (for example vaporizing the water or ethanol fluid) while maintaining its dispersion characteristics after condensation. Measurements of thermal resistance and degradation with temperature are made using thermogravimetric analysis (TGA), these corresponding to high resolution weight loss measurements during a thermal scan (see FIG. 15 below).

Another measurement characterising the chemical bonding structure is X-Ray photoelectron spectroscopy (XPS). This measurement is indicative of the chemical composition and type of bonding on the carbon structures. All XPS measurements (not shown here) indicate very simple structures of oxygen attached to carbon through single and double bonds for the O-GNF, while complex chemical structures exist for the commercial products. This highlights both the purity aspects of the O-GNF and the ability to withstand high temperatures without degradation product being generated.

Figure 15A:
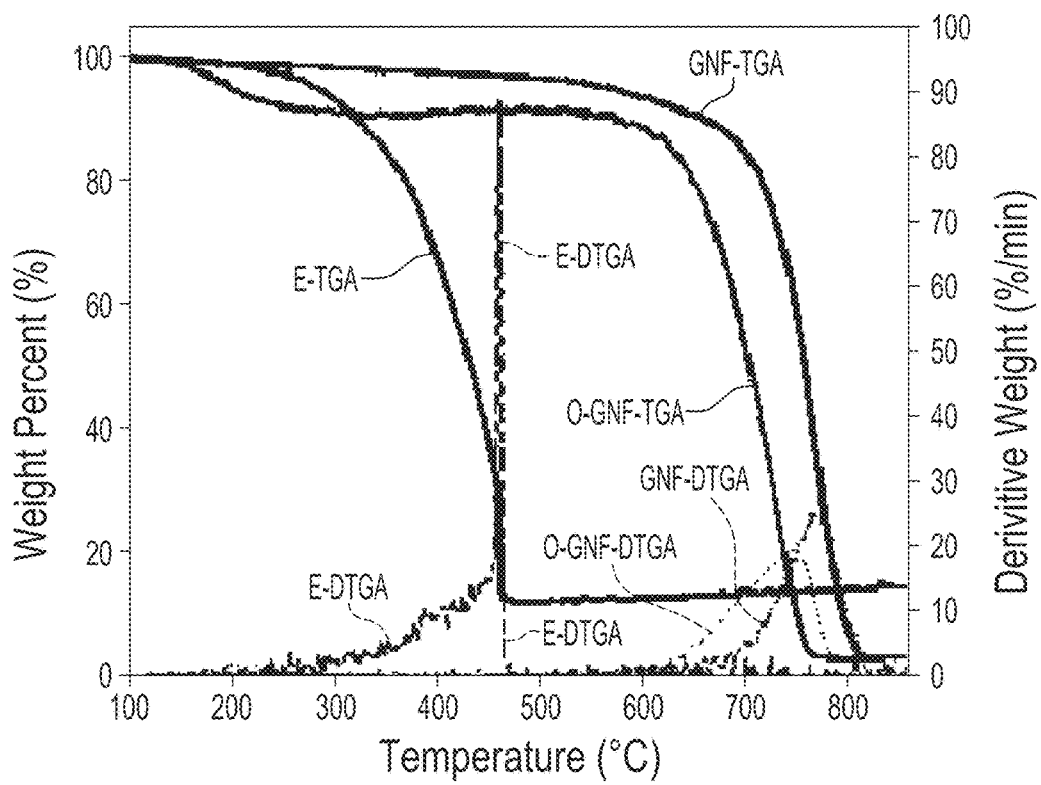
FIG. 15A illustrates a graph of Thermogravimetric Analysis (TGA) in Weight Percent (%) and Derivative Thermogravimetric Analysis (DTGA) in Derivative Weight (%/min) vs Temperature for samples of GNF, O-GNF, E (High surface area Reduced Graphene Oxide from Graphene Supermarket) giving the range of variability observed in thermal degradation temperatures, where O-GNF degradation occurs at roughly 750° C., while commercial materials have degradation temperatures varying between 450° C. and roughly 600° C.
Figure 15B:
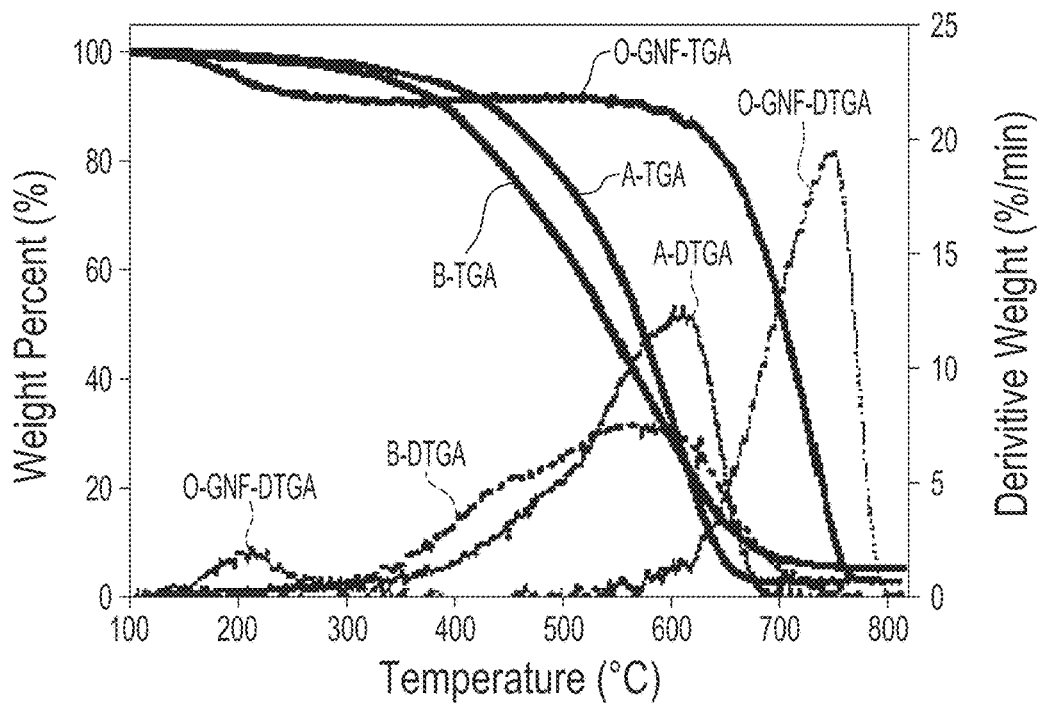
FIG. 15B illustrates a graph of Thermogravimetric Analysis (TGA) in Weight Percent (%) and Derivative Thermogravimetric Analysis (DTGA) in Derivative Weight (%/min) vs Temperature for samples of GNF, A (Edge Oxidized graphene powder and suspension from Sigma Aldrich) and B (Graphene Nano Powder from Graphene Supermarket) giving the range of variability observed in thermal degradation temperatures, where O-GNF degradation occurs at roughly 750° C., while commercial materials have degradation temperatures varying between 450° C. and roughly 600° C.

FIG. 15 present typical TGA and DTGA (derivative of the TGA curve showing peaks of mass losses corresponding the removal of specific structures at some temperature) curves of O-GNF compared to commercial products. One can observe the O-GNF curves always extends to higher temperatures than all other materials, and maintains a flat profile showing no mass loss before reaching its high degradation temperature. This is indicative of having primary bonds generated on the O-GNF, such bonds having a much stronger resistance to temperature than the adsorbed molecules used in typical surfactants-based fluidization agents. The O-GNF reaches 750° C. before degradation, a value higher by at least 100° C., and most often 200-350° C. to commercial products.

The invention claimed is:

1. A suspension of an oxygen-functionalized graphene nanoflake (O-GNF and/or O—N-GNF) comprising
   a single-crystal graphene nanoflake of 5-20 atomic planes comprising a surface oxygen-functionalization,
   wherein the O-GNF comprise a degree of oxygen functionalization from about 6% to about 25 at. % oxygen by weight of the GNF, and
   a polar solvent
   wherein the suspension comprises a zeta potential from about −37 mV to about −44 mV in 1 mM $NaHCO_3$ solution.

2. The suspension of claim 1, wherein the suspension is stable for at least 3 months.

3. The suspension of claim 1, wherein the suspension is stable for 1 year.

4. The suspension of claim 1, wherein the suspension is substantially free of surfactants.

5. The suspension of claim 1, wherein the zeta potential is from about −41 mV to about −44 mV in 1 mM $NaHCO_3$ solution.

* * * * *